Feb. 26, 1957 J. B. WALKER 2,782,683
SELECTIVE ELECTRICAL LENS ADJUSTING MECHANISMS
FOR VARIABLE MAGNIFICATION SYSTEMS
Filed Feb. 18, 1954 2 Sheets-Sheet 1
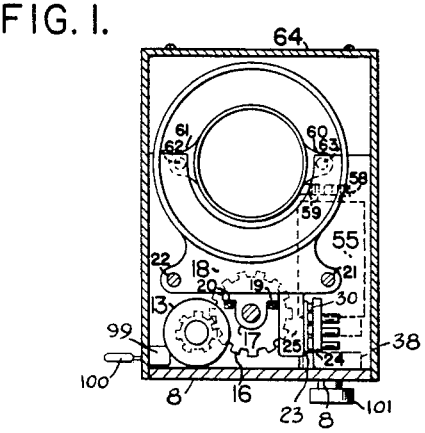
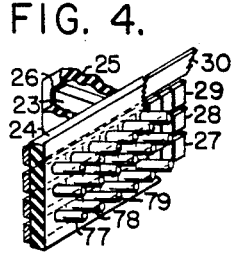
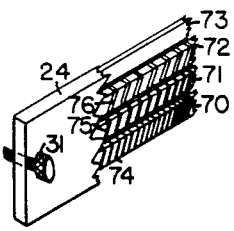
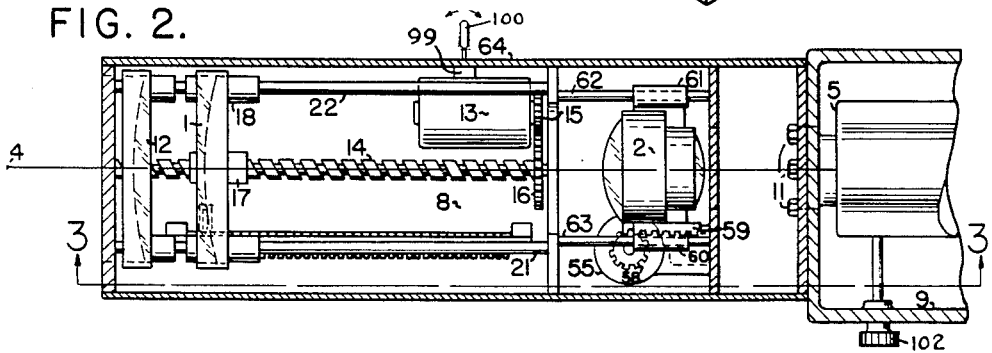
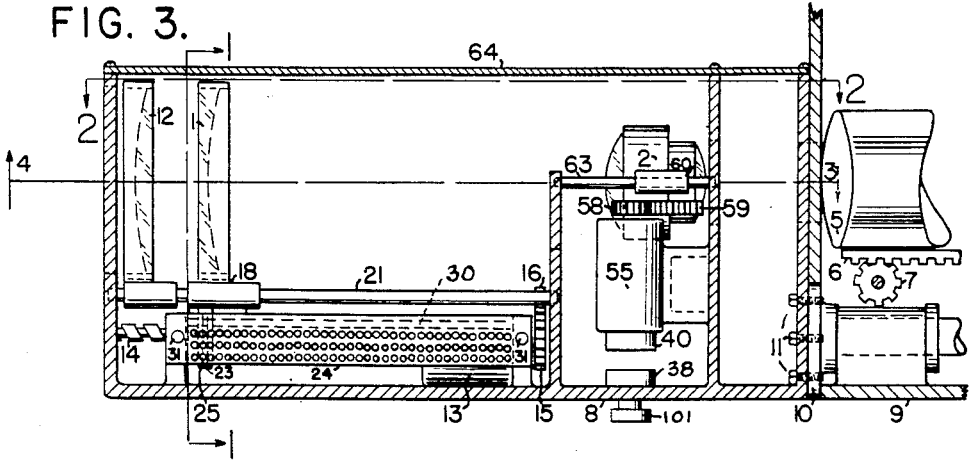
*INVENTOR.*
JOSEPH B. WALKER
BY *Harry R. Lubcke*
AGENT Feb. 26, 1957    J. B. WALKER    2,782,683
SELECTIVE ELECTRICAL LENS ADJUSTING MECHANISMS
FOR VARIABLE MAGNIFICATION SYSTEMS
Filed Feb. 18, 1954    2 Sheets-Sheet 2
FIG. 6.
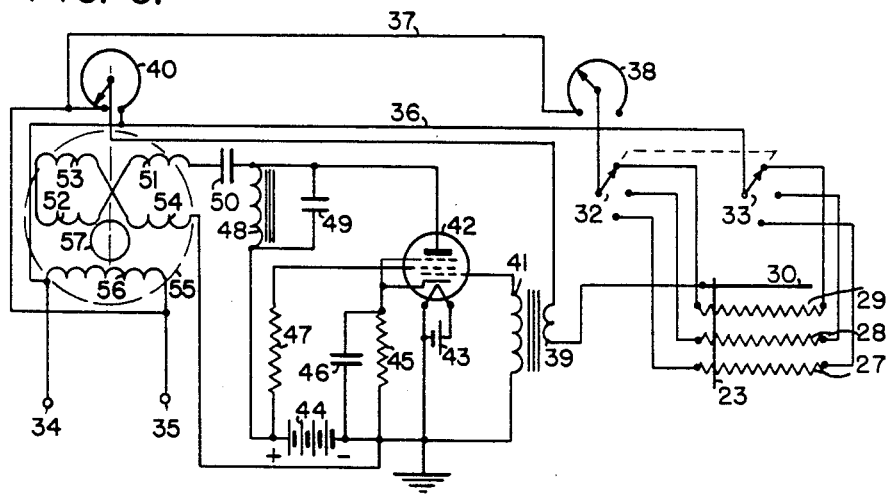
FIG. 7.
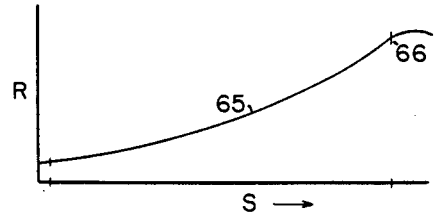
FIG. 8.
FIG. 9.
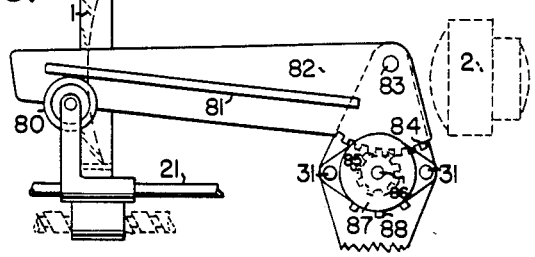
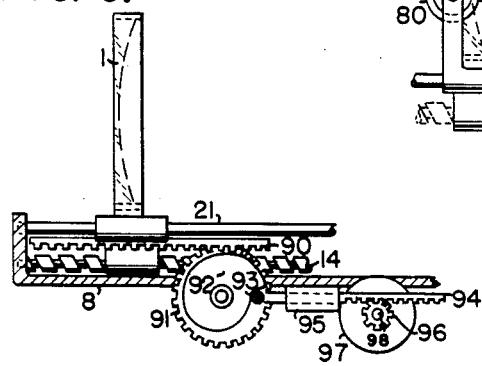
INVENTOR.
JOSEPH B. WALKER
BY Harry R. Lubcke
AGENT

United States Patent Office 2,782,683
Patented Feb. 26, 1957

2,782,683

SELECTIVE ELECTRICAL LENS ADJUSTING MECHANISMS FOR VARIABLE MAGNIFICATION SYSTEMS

Joseph B. Walker, Los Angeles, Calif.

Application February 18, 1954, Serial No. 411,060

15 Claims. (Cl. 88—57)

My invention relates to optical adjustments and particularly to means for electrically controlling the focal processes in a zoom lens. The lens elements are electrically controlled as to position during the zoom action, in which process the magnification of the image of the field of view is varied.

The variable focal length, or zoom, lens is being increasingly applied to the arts of television broadcasting and motion picture production. In live television there are no retakes and in motion pictures the production tempo has advanced to previously unattainable rates because of economic factors. These arts touch essentially the whole civilized world and because individuals are quick to note improvements in technology which can be seen, improved instrumentation has a high value.

Not least among such desirable accomplishments is automatic coaction and often remote actuation of the variable focal length lens. The optical elements in such a lens have been moved according to mechanical control means in the prior art. I have found that these elements may also be electromechanically controlled by electrically established routines which utilize information obtained from mechanical to electrical quasi-transducers, such as potentiometers, and exert control through electrical to mechanical transducers, such as servo motors. Such control can be precisely shaped by attention to the characteristics of the potentiometers, amplifier and other electrical entities. In the electrical arrangement control may be accomplished at any remote point by merely extending the control circuit wires thereto. In television, it is desirable to concentrate all control functions in a control room since therein are to be found image monitors, key (theatrical) production personnel and technicians engaged in making other operative adjustments on the television equipment.

Briefly, my invention embraces mechanical simplification of my well-known Electrazoom lens and control of the positions of the lens elements thereof during zoom operation by electrical rather than mechanical means. This lens has been described in my United States Patents 2,515,104, July 11, 1950; 2,532,685, December 5, 1950; and 2,547,187, April 3 1951. The adjustable cam thereof is replaced with a plurality of strip potentiometers of appropriate resistance vs. potentiometer travel characteristics.

The relative movement of the two principal lens elements in my Electrazoom device is different for different focal ranges of operation. If performers are to be approximately twelve feet from the camera during their performance one control regimen is invoked, if approximately four feet, another, and so on over a few such focal ranges. In this invention one potentiometer of the plurality provided handles each range. It is switched to control an amplifier and an actuating motor according to the range desired at any period in the performance; and zoom operation, controlled by another motor or manually, is carried out in accordance with the potentiometer characteristic when that operation is invoked. An additional rheostat, always in circuit, allows vernier adjustment at any point on any range.

An object of my invention is to electrically control the relative movements of lens elements in a variable focal length lens.

Another object is to provide remote electrical control of all functions of a variable focal length lens.

Another object is to provide electrical control means for a variable focal length lens free of backlash, the need for extensive lubrication or similar attention.

Another object is to embody a mechanically simple zoom lens.

Another object is to allow optical adjustments of a zoom lens to be made to electrical rather than to mechanical elements.

Another object is to provide plural control regimens for a group of distances from the object of principal interest in the field of view to the lens for keeping said object accurately in focus at any zoom adjustment of said lens.

Another object is to provide plural groups of control regimens for plural groups of distances from the object of principal interest to the lens, said groups being substitutionally coactive with said lens mechanism.

Other objects of my invention will become apparent upon reading the following detailed specification and upon examining the related drawings, in which:

Fig. 1 shows an end sectional elevation view of my mechanism,

Fig. 2 shows a sectional plan view of the same,

Fig. 3 shows a side sectional elevation of the same,

Fig. 4 shows a perspective detail of the strip potentiometer assembly,

Fig. 5 shows a similar view of an alternate type of strip potentiometer assembly, Fig. 6 shows the schematic electrical diagram for my mechanism, Fig. 7 shows a representative rate of change of resistance for a strip or an equivalent potentiometer, Fig. 8 shows an alternate embodiment of my invention utilizing rotary potentiometers in place of strip potentiometers, and Fig. 9 shows another alternate embodiment utilizing rotary potentiometers.

In Fig. 3 numeral 1 represents the movable diverging lens of my optical system. This coacts with a movable converging lens 2 to form an image 3 of an object of principal interest 4 in the field of view. Image 3 is shown formed upon picture surface 5 of a television camera tube, as an image-orthicon, that surface shown in pseudo-perspective for clarity of illustration. Alternately, surface 5 may be a light sensitive motion picture film, a sensitized plate in a still camera or a ground glass screen. Surface 5 is attached to a rack 6 engaged in pinion 7 for translatable adjustment of the position of the surface in order to accomplish general focusing of the image upon the surface. The main frame 8 of my mechanism is attached to camera case 9 by fastening the frame to turret flange 10 by means of cap screws 11.

In the mechanism, reversible motor 13 drives worm 14 through gears 15 and 16. Motor 13 is controlled by three position switch 99 having operating lever handle 100. (See Figs. 1 and 2.) When the handle is in the neutral position the motor is not energized, when it is moved by the operator in one direction the motor revolves in one direction, when moved in the opposite direction the motor revolves in the opposite direction. Internally threaded traveler nut 17 engages the worm and causes translatory motion of lens 1 when the motor is actuated. The traveler nut may be disconnected from support 18 of lens 1 by releasing thumb screws 19 and 20, or by an equivalent mechanical arrangement, for allowing the lens magnification to be changed manually. A rod attached to the supporting structure of lens 1 and extending axially beyond the lens may be employed for convenient manual control. Support 18 includes sleeve portions surrounding rods 21 and 22 upon which the lens 1 assembly translates. Lens 12 is similarly mounted on the rods and may also be translated. This lens is employed to reduce the overall effective focal length of the optical system.

The position of lens 1 is electrically monitored by brush 23 bearing upon strip potentiometer assembly 24. The brush is contained in holder 25 attached to support 18 and provided with spring 26 to force the brush against commutator-like contact segments of strip potentiometers 27, 28, 29 and contact bar 30. These details are shown in Fig. 4. In both Figs. 4 and 5 assembly piece 24 is composed of suitable insulating material, such as Bakelite. In Fig. 4 the segments and bar are of copper, the brush being carbon. As shown in Figs. 3 and 5 thumb setscrews 31 fasten the assembly to main frame 8 for coaction with brush 23, yet allow assemblies having the same mechanical dimensions but different electrical characteristics to be installed as desired. Bobbins 77, 78, 79 et al. are mounted upon element 24 behind the segments of strip potentiometer 27. In accordance with known potentiometer practice each bobbin is wound with suitable resistance wire and each end thereof soldered to adjacent segments. The next bobbin in line is similarly soldered, one connection thereof being connected to the same segment as before. In this way a conductive circuit is established along the whole length of the potentiometer, the resistance value between the extremities thereof being the sum of the resistance of the lengths of wire on the bobbins.

In order to continue the description in a logical manner reference is now made to the schematic diagram, Fig. 6. Strip potentiometers 27, 28, 29, contact bar 30 and brush 23 will be noted. Three-throw switches 32—33 are ganged so as to connect only one of the strip potentiometers to the rest of the circuit at any one time. At terminals 34—35 a source of power is connected, such as 115 volts 60 cycle alternating current, (A. C.). This is conveyed through conductor 36 to switch 33 and through conductor 37 and rheostat 38 to switch 32. As a consequence this voltage is impressed across the strip potentiometer connected in the circuit. Rheostat 38 is a vernier adjustment of electrical balance effective on any potentiometer switched in circuit and is included to accurately reconcile the electrical circuit to the optical distances required of lenses 1 and 2 in the zoom operation. Brush 23, of course, is at the same position as lens 1 and the potential given to it depends upon the position thereof along the active strip potentiometer, being a maximum at one end thereof and a minimum at the other. Through contact bar 30 the brush is connected to the primary 39 of an impedance adjusting transformer and thence through the variable arm of motor potentiometer 40 to power terminal 35.

By tracing the connections it will be noted that the strip potentiometer in circuit and motor potentiometer 40 are in parallel across the power source and that one end of the transformer winding 39 is connected to the sliding contact of one of these potentiometers. If both contacts are at the same relative position on the respective potentiometer there will be no voltage impressed across the winding. If both contacts are not at the same relative positions a voltage will be impressed across the winding, of amplitude depending upon the difference in positions and of instantaneous polarity depending upon the direction of the difference in positions. A current flows accordingly, a stepped-up voltage appears across coil 41 of the transformer and this is impressed across the input terminals, grid to cathode, of vacuum tube 42. This tube is energized in substantially the usual manner, heater energy from battery 43 and anode and screen grid energy from battery 44, or equivalents, a self-bias is provided to the grid-cathode circuit by resistor 45 and bypass capacitor 46, the screen grid potential is reduced from that of the anode by resistor 47 and a relatively high impedance load is presented to the anode circuit by the parallel inductance-capacitance circuit 48—49, the same being resonant at approximately the frequency of the power supply 34—35, with amplitude of response limited by the inherent resistance of inductance 48. Capacitor 50 provides coupling to shading coils 51, 52, 53 and 54 of motor 55, this being of the shaded pole type and reversible. Element 56 is the motor field and 57 the armature. Potentiometer 40 and pinion 58 are mechanically connected to the armature through known speed reduction gears within the motor. See Fig. 3.

It is evident that the motion of the motor as imparted to potentiometer 40 and pinion 58 will follow the position of brush 23 on the strip potentiometers. Should this not be so the electrical unbalance brought about by the relative difference in position between brush 23 and the rotary arm of potentiometer 40 causes a corresponding current flow through transformer primary 39, an amplified current through the shading coils and a proper corrective motion by the motor armature. Stated in another way, the motor follows the brush as its position is electrically interpreted along the strip potentiometer.

In this manner the necessary motion is obtained for the converging lens 2. The same is provided with a rack 59, which engages pinion 58; the lens translating along the optical axis upon sleeves 60—61 surrounding rods 62—63. The motion of lens 2 must be related to that of lens 1 in an inverse and non-linear manner in order to accomplish variable magnification while retaining focus. Lens 2 must move toward the subject a nominal amount while lens 1 moves away from it a larger amount and the motion of lens 2 must be more rapid as the two near positions of proximity. This has previously been accomplished to the necessary degree of precision by the adjustable cam of my aforementioned patents. In this invention I secure the precise motional cofunctioning by changing the incremental resistance along the strip potentiometers.

As has been mentioned the operator controls the position of lens 1 according to the magnification desired but the motion of lens 2 is determined by the electrical circuit of Fig. 6 and is automatically controlled by the position of lens 1.

A typical characteristic is shown in Fig. 7. Here, resistance R is plotted as a function of distance S of travel of brush 23 along a strip potentiometer. In this plot the low value of resistance corresponds to low magnification, i. e., the lenses far apart. The slope of curve 65 is noted to increase with distance, attaining a maximum value just prior to reaching a point of inflection, at approximately which point I find it desirable to limit the zoom action, i. e., at point 66. This means that the resistance values of the bobbins 77, 78, 79, etc. increase as lens 1 travels from left to right in Fig. 3. Since the servo system diagrammed in Fig. 6 operates on electrical values rather than mechanical position of lens 1 the necessary motion of lens 2 is obtained. The angular motion of pinion 58 increases with respect to the linear motion of lens 1 as point 66 is approached, thus providing the required non-linear motion of lens 2.

It is easily seen that by fabricating the several bobbins of appropriate resistance values I can obtain any function for the relative motions. Furthermore, should a particular set of lenses have somewhat different optical properties than the average, I can correct the motions to any desired degree of refinement by appropriately increasing or decreasing the resistance value of the bobbins in the region where the departure exists. The horizontal position of curve 65 may be altered by adjusting the vernier rheostat 38, thereby altering the position of lens 2 with respect to that of 1. The vernier may also be used at any particular positions of the lenses to provide a focal range between those provided by the strip potentiometers or to refine optical sharpness by individual adjustments manually performed by the operator. Rheostat 38 is shown in Fig. 3. It is adjusted by knob 101.

In Fig. 5 is shown an alternate construction for the strip potentiometers. Rather than bobbins and commutator contacts as shown in Fig. 4, appropriately wound resistance wire performs the whole function. Strips 70, 71, 72 are more or less identical pieces of an elevated-temperature-resistant insulator, of which certain grades of Bakelite, glass bonded mica or ceramics are examples. Mechanically substantial resistance wires 74, 75, 76 are wound tightly thereabout, these wires being insulated or wound with a space between turns. The pitch of winding is altered along the length to give the resistance vs. distance function shown in Fig. 7. These strips are then attached to assembly piece 24 and the side adjacent to brush 23 abraided to give a clean metal contact thereto. In this instance the brush may be made of Phosphor bronze, beryllium copper or other alternate brush material.

In either strip potentiometer assembly construction the objective of the separate strips of each assembly and of the interchangeable assembly arrangement is to attain precise positioning of lens elements under all conditions of object to lens distance and zoom or static value of desired magnification. This has been an optical problem of long standing. It is solved mechanically in my previously mentioned patented inventions by a focus control upon the zoom lens which is set for the middle value of object to lens distances to be used for any group of scenes and readjusted for any which depart considerably from this value. In the present electrical manner of obtaining an adjustable cam action I provide individual strip potentiometers for several object to lens distances. For instance, for news commentator and intimate types of programs an assembly having potentiometers giving sharp focus at any magnification for object to lens distances of approximately six, eight and ten feet is provided. For usual studio work another assembly for ten, fifteen and twenty feet is provided. For outdoor and sports subjects another assembly for twenty-five, fifty and one-hundred feet is provided, the latter also serving from a hundred feet to infinity.

The electrical difference characterizing each of these focal ranges is a difference in the inclination of the resistance curve 65 of Fig. 7. For small object to lens distances the curve is steeper than shown and for large distances correspondingly less steep than the average function shown.

With the electrical cam action of this invention it will be appreciated that greater travel of lens elements and variation in rate of travel thereof may be attained than with mechanical arrangements. In the latter, untoward forces in the kinematic structure limit the degree of mechanical advantage which can be attained in a necessarily smooth running device. In the electrical servo link these mechanical limits are removed and the limitations imposed by the electrical instrumentalities are less severe, resulting in a net gain in the scope of operational adjustment.

Fig. 8 shows an alternate embodiment of my invention employing rotary potentiometers. Lens 1 translates on rods 21, 22 as before, but is provided with a cam follower 80 upon which an essentially straight cam 81 rides. Cam plate 82 is pivoted at 83 and teeth 84 engage pinion 85. Motion of lens 1 therefore causes revolution of pinion-potentiometer shaft 86 upon which is mechanically ganged a plurality of potentiometers, one behind the other in the figure, the front one being element 87. Each potentiometer is constructed with a non-linear resistance vs. rotation characteristic. This is obtained by utilizing a variable winding pitch as explained in connection with strip potentiometers 70, 71, 72. Electrically, the new potentiometers take the place of potentiometers 27, 28, 29 in Fig. 6 and the rest of the circuit is the same.

In this embodiment a combined mechanical and electrical correction to relative lens travel is possible. Instead of being straight, cam 81 may have a slight curve or may have undulations. These are combined with the electrical characteristic previously mentioned, resulting in an adjusted characteristic mechanically determined for all ranges and electrically modified for each range. The rotary potentiometers may be interchanged by loosening thumb screws 31 as before. See Fig. 8. The center terminal of each potentiometer, as 88, is internally connected to the sliding contact thereof and externally to the lower end of transformer coil 39, as was brush 23 in the original embodiment.

Another embodiment of my invention is shown in Fig. 9. Here lens 1 again translates upon rods 21, 22, but is provided with a toothed rack 90. When the lens is translated by worm 14 the rack turns engaged gear 91 and therefore cam 92, one revolution thereof corresponding to the travel of lens 1. Follower 93 imparts a translatory motion to rack 94, which is journalled in bearing 95 attached to frame 8. Pinion 96 is rotated by motion of rack 94 and therewith the movable arm of rotary potentiometer 97. A ganged assembly may be driven in this manner from shaft 98 and other details are similar to those of Fig. 8. The potentiometers preferably have a resistance-rotation curve equivalent to that of Fig. 7 and modification thereof may be accomplished by utilizing other than a uniform spiral for the working surface of cam 92.

A preferred physical grouping for the components of this invention is that wherein the optical and motive elements are a part of the lens proper, as shown in Figs. 1, 2, and 3; switches 32 and 33 are attached to a control position on camera 9 and the amplifier, comprising vacuum tube 42 and associated elements, is housed in a small box attached to the camera, its pedestal support, contained within the camera or located adjacent to the lens. When the lens is manipulated from the control room as previously described, switches 32 and 33, rheostat 38, and the electrical control 99 for motor 13 are located in the control room and the connecting wires involved extended to allow such physical separation. Since these matters are well understood by those skilled in the art further details are not presented.

There are, however, certain alternate embodiments within the scope of this invention and these are now recited. Suitable values for the resistance of strip potentiometers 27, 28, 29 and the described alternates are of the order of thousands of ohms when transformer 39—41 is utilized. If values of the order of tens of thousands of ohms are utilized the transformer may be omitted in favor of known impedance or resistance coupling to vacuum tube 42. This tube may be a triode or quartrode rather than a tetrode, or may be an equivalent transistor, the requirement being that the current output from the anode be sufficiently large to adequately energize the shading coils 51, 52, 53, 54 for control of motor 55.

Although preferred positions for the components of the lens structure have been shown it will be understood that such modifications as positioning the strip potentiometers at the side or top of the structure rather than at the bottom may be utilized and that the rotary potentiometers may be positioned at the top or bottom rather than at the side. Similarly, the positions of drive and servo motors may be altered. The objective is to obtain smooth coaxial translation of lenses 1 and 2 according to a relation generally shown in Fig. 7. Main frame 8 and cover 64 have been shown of square cross-section. See Fig. 1. This may be altered, of course, to be an elongated oval with major axis vertical, a pair of merged circles or a circle with a tangent-like lower rectangular shape addition. Contact bar 30 may be dispensed with if a pigtail flexible connection from brush 23 to coil 39 is substituted. Similarly, known roller type contacts making satisfactory contact to the strip potentiometers may take the place of the brush.

By suitable increase in the power handling capabilities of the potentiometers and attention to matching the impedance of the shading coils of the motor thereto the amplifier may be omitted. The remaining elements comprise a servo system in the absence of the amplifier. Other servo systems than the one shown may be substituted, including those with various feedback schemes, as long as the recited relative motions of lenses 1 and 2 are precisely executed. The positions of these lenses shown in Fig. 3 correspond to nearly minimum magnification, that is, the lenses are at nearly maximum separation.

I thus attain the several objects of my invention.

Specific values have been given to certain independent variables in this specification in order to most fully teach how the invention may be embodied; however, wide variation may be taken from such values and changes in the details of the electrical circuits may be made. Other modifications in the size, proportions, shape and arrangement of parts may be made without departing from the spirit of the invention.

Having thus fully described my invention and the manner in which it is to be practiced, I claim:

1. In a variable focal length lens adjusting mechanism, a divergent lens, means to axially translate said lens, plural similar mechanically adjusted electrical impedance devices alterable in impedance in accordance with said translation, an amplifier controlled by one of said devices, the combination of amplifier and device having predetermined non-linear input-output characteristics in amplitude of electrical energy, an electrically controlled mechanical means actuated by said energy connected to a convergent lens for movement thereof coaxially with respect to said first lens to change the focal length of the divergent-convergent lens combination and means to switch said amplifier from one to another of said impedance devices to focus an image of objects at different distances from said lens combination upon an image surface.

2. A variable focal length lens adjusting mechanism comprising diverging and converging lenses, means to axially translate said diverging lens, a mechanically adjusted electrical impedance element mechanically actuated by said motion having an electrical characteristic non-linear with respect to said motion, servo means electrically connected to said element and to an electric motor, said motor mechanically connected to said converging lens for movement thereof coaxially with respect to said prior lens according to said non-linear characteristic for the variation of the focal length of the recited optical combination.

3. In a variable magnification lens adjusting mechanism, electrical controlling means for non-linearly altering the coaxial motional relation between separately movable diverging and converging lenses thereof to retain focus of the image formed of objects at various ranges of distances from said mechanism comprising, plural linearly disposed resistance elements individually having non-linear electrical characteristics corresponding to the motional regimen required for one of said ranges, a movable electrical contact attached to said diverging lens to electrically represent the position of said diverging lens of said mechanism upon said resistance elements, switching means to select a desired resistance element and motor operated means electrically connected to the selected resistance element through said switching means to position said converging lens of said mechanism according to the electrical characteristic of the element selected.

4. In a variable focal length lens adjusting device an electromechanical servo system for positioning optically coactive spaced movable diverging and converging lens elements of said device comprising, plural potentiometers, each potentiometer of said plurality having an electrical characteristic proportional to the converging lens position required for a particular distance range of the object of principal interest in the field of view from said lens device, means to connect a desired potentiometer to said servo system, means to move the movable contact of said connected potentiometer according to the position of the diverging lens element of said device, means to reproduce in mechanical motion the electrical characteristic of said potentiometer as swept over by said movable contact and means connected thereto for moving said converging lens element according to said mechanical motion, the recited motions of said lens elements changing the focal length of said lens device.

5. In the lens adjusting device of claim 4, said means to reproduce in mechanical motion the electrical characteristics of said potentiometer comprising a reversible electric motor, an electric potentiometer having a rotatable contact operatively connected thereto, electrical means to regulate said motor to hold said rotatable contact at the same relative position as the movable contact of the first-mentioned potentiometer, said motor mechanically connected to the converging lens for the movement thereof corresponding to that of said rotatable contact.

6. A variable focal length lens adjusting electromechanical system comprising a movable diverging lens, a converging lens coaxially movable therewith, an electrical impedance element having a movable contact, means to move said contact according to the movement of said diverging lens, the rate of change of impedance with lens travel increasing as said diverging lens moves toward said converging lens, an electric motor, a kinematic chain connected thereto and to said diverging lens for the movement thereof, a reversible electric control motor, a rotary electrical potentiometer operatively attached thereto, mechanical means operatively connecting said control motor to said converging lens for the movement thereof, an electrical servo electrically connected to said electrical impedance, to said control motor and to said potentiometer, said servo actuating said control motor to move said converging lens toward said diverging lens according to said rate of change of impedance, said potentiometer effecting electrical indication to said servo of the position of said control motor in accomplishing the motion of said converging lens.

7. In a remote control variable magnification lens mechanism, a movable lens, plural elongated electrical elements disposed parallel to the path of said movable lens, a contactor attached to said lens bearing upon said elements, a reversible electric motor mechanically connected to move said lens, a second lens having opposite optical convergence to said first lens, means to move said second lens coaxially with respect to said first lens according to the incremental values along one said elongated electrical element discerned by motion of said first lens, a switch for selecting one electrical element from said plurality, means to control said electric motor, said switch and said control means located remotely from the other recited elements, wires connecting said switch to said electrical elements and other wires connecting said control means to said electric motor.

8. A variable focal length lens adjusting apparatus comprising a movable diverging lens, a converging lens coaxially movable thereto, an electrical element disposed along the path of said diverging lens, a contactor attached to said lens bearing upon said element, means to move said diverging lens, manual means to control said means to move said diverging lens, a reversible electric control motor, a rotary electrical element attached thereto, mechanical means to move said converging lens by said control motor, an electrical servomechanism connected to said electrical element, to said control motor and to said rotary electrical element, the electrical characteristics of said electrical element varying with distance at a greater rate as said diverging lens moves toward said converging lens, said control motor acting through said mechanical means to move said converging lens toward said diverging lens as said diverging lens moves toward said converging lens, the rate of motion of said converging lens corresponding to said rate of variation of said electrical characteristic, said connection of said rotary electrical element to said electrical servomechanism constituting a feed-back link to control said control motor in the recited motion of said converging lens.

9. A variable magnification lens adjusting mechanism comprising a diverging lens and a converging lens, said lenses coaxially movable, an electric contact attached to said diverging lens contacting a potentiometer disposed parallel to the direction of motion of said coaxially movable lenses, a reversible electric motor, operator control means connected to said motor, mechanical means to connect said motor to said diverging lens for the movement thereof, the rate of change of resistance with distance along said potentiometer increasing as said movable diverging lens approaches said movable converging lens, a second reversible motor, a rotary contact potentiometer mechanically connected thereto and electrically connected in shunt to the first mentioned potentiometer, a vacuum tube connected to the movable contacts of both said potentiometers and to said second motor for the control of said second motor in accordance with said rate of change of resistance, mechanical means to connect said second motor to said converging lens for the movement thereof, the directions of motion of said movable lenses sensed to bring said lenses together for increased magnification and apart for decreased magnification.

10. A variable magnification lens adjusting mechanism according to claim 9 wherein said potentiometer disposed parallel to the direction of motion of said coaxially movable lenses is composed of commutator-like segments aligned to contact said electrical contact, with individual resistance units connected between said segments.

11. A variable magnification lens adjusting mechanism according to claim 9 wherein said potentiometer is composed of a spirally wound resistive conductor aligned to contact said electrical contact on the convolutions of said conductor.

12. A variable magnification lens mechanism comprising a movable diverging lens, a converging lens movable coaxially with respect thereto, an electric motor, operator control means connected to said motor, a kinematic chain connected thereto and to said diverging lens for the movement thereof, a follower attached to said diverging lens, a pivoted cam bearing upon said follower, an electrical potentiometer having a movable contact, means to move said contact connected thereto and to said cam, a control motor, a second kinematic chain connecting said control motor to said converging lens for the movement thereof, an electrical servo amplifier electrically connected to said potentiometer and to said control motor, said servo amplifier actuating said control motor to move said converging lens toward said diverging lens at a rate determined by the change in amplifier circuit resistance occasioned by motion of said movable contact as determined by said cam upon said diverging lens moving toward said converging lens, said motors being mutually reversible for the variation of optical magnification in the opposite sense to that recited.

13. A variable magnification lens positioning apparatus comprising a movable diverging lens, a converging lens movable coaxially with respect thereto, an electric motor, operator control means connected to said motor, a kinematic chain connected thereto and to said diverging lens for the movement thereof, a second kinematic chain connected to said diverging lens and to a spiral cam, a cam follower, a third kinematic chain connected to said follower and to an electrical potentiometer having a rotatable contact for the rotation of said contact, said rotation being at a more rapid rate as said diverging lens approaches said converging lens because of the motional characteristics of the recited mechanism coactive between said diverging lens and said rotatable contact, a reversible control motor, a fourth kinematic chain connecting said control motor to said converging lens for the movement thereof, an electrical servo amplifier electrically connected to said potentiometer and to said control motor, said servo amplifier actuating said control motor to move said converging lens toward said diverging lens according to said rate, said lens motions being mutually reversible for variation of optical magnification in the opposite sense to that recited.

14. A variable magnification lens positioning apparatus according to claim 13 wherein said first kinematic chain is comprised of gears, a worm and a worm nut, and wherein said second, third and fourth kinematic chains are each comprised of a rack and gear.

15. A variable focal length lens adjusting mechanism comprising in order along an optical axis, a stationary converging lens, a movable diverging lens and a movable converging lens, a brush attached to said movable diverging lens, said brush bearing simultaneously upon a plurality of strip potentiometers and upon a contact bar, a reversible motor, operator control means connected to said motor, a worm connected to said motor, said worm disposed parallel to said strip potentiometers and said bar, a nut connected to said movable diverging lens and engaging said worm so that actuation of said motor translates said lens along said optical axis and said brush along said potentiometers, the rate of change of resistance with distance along said potentiometers increasing as said movable diverging lens approaches said movable converging lens, a double pole switch for selecting one of said strip potentiometers corresponding to the approximate distance of the object of principal interest in the field of view of said variable focal length lens and connecting the same to a transformer and to a rotary potentiometer, a vacuum tube having electrodes, said transformer also connected to the input electrodes of said vacuum tube, an electric reversible shaded-pole control motor, the output electrodes of said vacuum tube connected to the shading coils of said control motor for the electrical control thereof in relation to the position of said brush upon one of said strip potentiometers, a rack attached to said movable converging lens, a gear attached to said control motor engaging said rack, the directions of rotation of both said motors sensed to move both said movable lenses together upon energization of said reversible motor in one direction and apart upon energization thereof in the opposite direction, said strip potentiometers constructed with a rate of change of resistance therealong corresponding to the movement required of said movable convergent lens to maintain the object of principal interest at a group of distances from said lens in focus for any adjustment of said mechanism, and removably mounted for substitution of other strip potentiometers for other said groups, the optical magnification of the image of said object being different for each positioning of said movable lenses.

References Cited in the file of this patent

UNITED STATES PATENTS

| | | |
|---|---|---|
| 1,268,472 | Kellum | June 4, 1918 |
| 1,271,929 | Nelson | July 9, 1918 |
| 1,790,232 | Flora | Jan. 27, 1931 |
| 2,165,341 | Capstaff et al. | July 11, 1939 |
| 2,515,104 | Walker | July 11, 1950 |
| 2,532,685 | Walker | Dec. 5, 1950 |
| 2,547,187 | Walker | Apr. 3, 1951 |
| 2,563,892 | Waller et al. | Aug. 14, 1951 |
| 2,663,223 | Hopkins | Dec. 22, 1953 |